United States Patent
Tsai et al.

(10) Patent No.: US 9,179,402 B2
(45) Date of Patent: Nov. 3, 2015

(54) APPARATUS AND METHODS FOR SERVICE ACQUISITION WHEN MOVING IN AND OUT OF FOURTH GENERATION (4G) NETWORKS WITH DIFFERENT CIRCUIT-SWITCHED FALLBACK (CSFB) SUPPORT

(71) Applicant: QUALCOMM Incorporated, San Diego, CA (US)

(72) Inventors: Shiau-He Shawn Tsai, San Diego, CA (US); Ta-Yan Siu, San Diego, CA (US); Guangming Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 14/046,663

(22) Filed: Oct. 4, 2013

(65) Prior Publication Data

US 2015/0029949 A1    Jan. 29, 2015

Related U.S. Application Data

(60) Provisional application No. 61/859,645, filed on Jul. 29, 2013.

(51) Int. Cl.
*H04W 48/18* (2009.01)
*H04W 84/12* (2009.01)

(52) U.S. Cl.
CPC .............. *H04W 48/18* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,991,387 B2 | 8/2011 | Rowley et al. | |
| 8,504,017 B1 * | 8/2013 | Hietalahti et al. | 455/426.1 |
| 2012/0224563 A1 | 9/2012 | Zisimopoulos et al. | |
| 2013/0070728 A1 * | 3/2013 | Umatt et al. | 370/331 |
| 2013/0083775 A1 | 4/2013 | Sun et al. | |
| 2013/0136115 A1 * | 5/2013 | Moisanen et al. | 370/338 |
| 2013/0150032 A1 * | 6/2013 | Pattaswamy et al. | 455/434 |
| 2013/0252615 A1 * | 9/2013 | Lee et al. | 455/437 |
| 2013/0344873 A1 * | 12/2013 | Sane et al. | 455/437 |
| 2014/0071951 A1 * | 3/2014 | Liu et al. | 370/332 |

(Continued)

FOREIGN PATENT DOCUMENTS

KR    2006110066 A    10/2006

OTHER PUBLICATIONS

ETSI (2012). Universal mobile telecommunications system (UMTS); LTE; Non-access-stratum (NAS) protocol for evolved packet system (EPS); Stage 3 (3GPP TS 24.301 version 10.7.0 release 10), ETSI TS 124 301 V10.7.0 (Jul. 2012).

(Continued)

*Primary Examiner* — Hong Cho
(74) *Attorney, Agent, or Firm* — Arent Fox LLP

(57) ABSTRACT

A method, an apparatus, and a computer program product for wireless communication at a fourth generation (4G) capable user equipment (UE) include determining, when the 4G capable UE does not report a 4G capability but reports one or more other radio access technology (RAT) capabilities, a 4G service change possibility for the 4G capable UE, performing a 4G network search and measurement procedure in response to the determination of the 4G service change possibility, and performing a combined evolved packet system/circuit switched (EPS/CS) attach attempt procedure when the 4G network search and measurement procedure indicates a 4G network availability.

20 Claims, 6 Drawing Sheets

(56) References Cited

U.S. PATENT DOCUMENTS

2014/0348064 A1* 11/2014 Jeong et al. .................. 370/328
2015/0003228 A1* 1/2015 Choi et al. .................... 370/216

OTHER PUBLICATIONS

International Search Report and Written Opinion—PCT/US2014/048043—ISA/EPO—Dec. 1, 2014 (10 pages).
QUALCOMM Incorporated: "Voice Centric UE behavior when backed-off while camping on E-UTRAN", 3GPP Draft; S2-131087_voice_centric_backoff_DP_CT1sa2_V2, 3rd Generation Partnership Project (3GPP), Mobile Competence Centre; 650, Route Des Lucioles ; F-06921 Sophia-Antipolis Cedex; France, vol. SA WG2. no. San Diego. USA; 20130408-20130412 Apr. 10, 2013, XP050708483, Retrieved from the Internet: URL:http://www.3gpp.org/ftp/tsg_sa/WG2_Arch/TSGS2_96_San_Diego/Docs/ 5 pages).
Research in Motion UK Limited: "Handling of CS services while MM back-off timer is running ", 3GPP Draft; S2-122676_S2_91_DP_CS While PS Back Off Timer is Running. 3rd-Generation Partnership Project (3GPP), Mobile Competence Centre ; 650. Route Des Lucioles ; F-06921 Sophia-Antipolis Cedex; France, vol. SA WG2. no. Barcelona. Spain; Jul. 9, 2012-Jul. 13, 2012, XP050633222, Jul. 3, 2012, (3 pages).
ZTE: "UE reselecting from LTE to 2G/3G for CS services when backed-off from PS domain", 3GPP Draft; S2-122967 DP-Reselecting From LTE When BO-R5, 3rd Route Des Lucioles , F-06921 Sophia-Antipolis Cedex; France, vol. SA WG2. no. Barcelona, Spain; Jul. 9, 2012-Jul. 13, 2012, XP050633487, Jul. 3, 2012, (4 pages).

* cited by examiner

APPARATUS AND METHODS FOR SERVICE ACQUISITION WHEN MOVING IN AND OUT OF FOURTH GENERATION (4G) NETWORKS WITH DIFFERENT CIRCUIT-SWITCHED FALLBACK (CSFB) SUPPORT

CLAIM OF PRIORITY UNDER 35 U.S.C. §119

The present Application for Patent claims priority to U.S. Provisional Application Ser. No. 61/859,645 entitled "APPARATUS AND METHODS FOR SERVICE ACQUISITION WHEN MOVING IN AND OUT OF FOURTH GENERATION (4G) NETWORKS WITH DIFFERENT CIRCUIT-SWITCHED FALLBACK (CSFB) SUPPORT" filed Jul. 29, 2013, and assigned to the assignee hereof and hereby expressly incorporated by reference herein.

BACKGROUND

1. Field

The present disclosure relates generally to communication systems, and more particularly, to apparatus and methods for service acquisition when moving in and out of fourth generation (4G) networks with different circuit-switched fallback (CSFB) support.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology.

CSFB is a technique that delivers voice-services to a user equipment (UE) when the UE is camped in an LTE network but the LTE network does not support voice services natively. Currently, when a UE that is required to support voice service determines that an available LTE or 4G network does not support CSFB, in order to avoid disruption in voice services, the UE inhibits operating according to LTE and only reports second generation (2G) and/or third generation (3G) capability. In this case, the UE may later resume supporting LTE at the time of the next power on/off cycle of the UE, but loses 4G access until then even if, before that next power on/off cycle, the UE moves to an LTE network that does support CSFB.

As the demand for mobile broadband access continues to increase, there exists a need for further improvements in LTE technology. Preferably, these improvements should be applicable to other multi-access technologies and the telecommunication standards that employ these technologies. Thus, in this case, improved service acquisition is desired for 4G-capable UEs moving in and out of 4G networks with different CSFB support.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided for wireless communication at a 4G capable UE, including determining, when the 4G capable UE does not report a 4G capability but reports one or more other radio access technology (RAT) capabilities, a 4G service change possibility for the 4G capable UE, performing a 4G network search and measurement procedure in response to the determination of the 4G service change possibility, and performing a combined evolved packet system/circuit switched (EPS/CS) attach attempt when the 4G network search and measurement procedure indicates a 4G network availability.

In another aspect of the disclosure, a 4G capable UE is provided that includes a 4G service change possibility determination component configured to determine, when the 4G capable UE does not report a 4G capability but reports one or more other RAT capabilities, a 4G service change possibility for the 4G capable UE, and a service acquisition component configured to perform a 4G network search and measurement procedure in response to the determination of the 4G service change possibility, and perform a combined EPS/CS attach attempt procedure when the 4G network search and measurement procedure indicates a 4G network availability.

In another aspect of the disclosure, a 4G capable UE is provided that includes means for determining, when the 4G capable UE does not report a 4G capability but reports one or more other RAT capabilities, a 4G service change possibility for the 4G capable UE, means for performing a 4G network search and measurement procedure in response to the determination of the 4G service change possibility, and means for performing a combined EPS/CS attach attempt procedure when the 4G network search and measurement procedure indicates a 4G network availability.

In another aspect of the disclosure, a computer program product operable by a 4G capable UE is provided that includes a computer-readable medium, including code executable by a computer to determine, when the 4G capable UE does not report a 4G capability but reports one or more other RAT capabilities, a 4G service change possibility for the 4G capable UE, code executable by the computer to perform a 4G network search and measurement procedure in response to the determination of the 4G service change possibility, and code executable by the computer to perform a combined EPS/CS attach attempt procedure when the 4G network search and measurement procedure indicates a 4G network availability.

DETAILED DESCRIPTION

Figure 1:
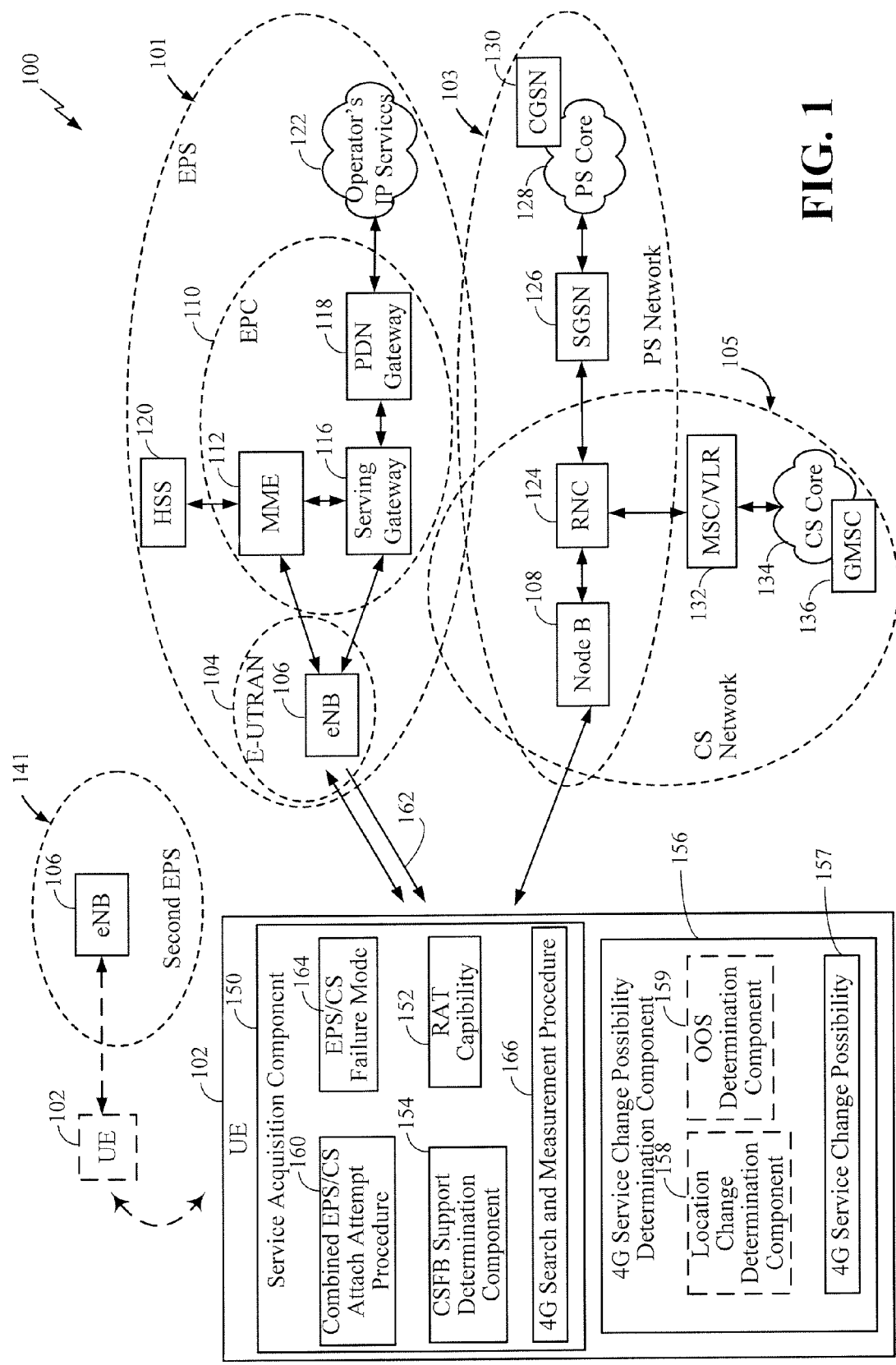
FIG. 1 is a diagram illustrating a system for service acquisition in 4G-capable UEs.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

According to some aspects of the present disclosure, an apparatus and method provides improved service acquisition in a 4G-capable UE that is inhibited from accessing a 4G network, such that 4G service is acquired by the 4G-capable UE without requiring a power on/off cycle of the 4G-capable UE.

Referring to FIG. 1, in one aspect, system 100 includes a UE 102 that may communicate with an evolved Node B (eNB) 106 in an available LTE network architecture that may be Evolved Packet System (EPS) 101 or second EPS 141. In what follows, some non-limiting aspects of the present disclosure are described with reference to EPS 101, however, these aspects may alternatively or additionally refer to second EPS 141.

EPS 101 may include Evolved UMTS Terrestrial Radio Access Network (E-UTRAN) 104, Evolved Packet Core (EPC) 110, Home Subscriber Server (HSS) 120, and Operator's IP Services 122. EPS 101 provides packet-switched services, however, as those skilled in the art will readily appreciate, the various concepts presented throughout this disclosure may be extended to networks providing circuit-switched services. In some aspects, EPS 101 may interconnect with other access networks, such as packet switched (PS) network 103, circuit switched (CS) network 105, etc. In one aspect, PS network 103 may include Node B 108, radio network controller (RNC) 124, Serving GPRS Support Node (SGSN) 126, PS core 128, and Combined GPRS Service Node (CGSN) 130. In one aspect, CS network 105 may include Node B 108, RNC 124, Mobile services Switching Centre (MSC)/Visitor location register (VLR) 132, CS core 134, and Gateway Mobile Switching Centre (GMSC) 136.

E-UTRAN 104 includes eNB 106 and may include other eNBs. eNB 106 provides user and control planes protocol terminations toward UE 102. eNB 106 may be connected to other eNBs via a backhaul (e.g., an X2 interface). eNB 106 may also be referred to as a base station, a base transceiver station, a radio base station, a radio transceiver, a transceiver function, a basic service set (BSS), an extended service set (ESS), or some other suitable terminology. eNB 106 provides an access point to EPC 110 for UE 102. Examples of UE 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

eNB 106 is connected by an S1 interface to EPC 110. EPC 110 includes Mobility Management Entity (MME) 112, Serving Gateway 116, and Packet Data Network (PDN) Gateway 118, and may include other MMEs. MME 112 is the control node that processes the signaling between UE 102 and EPC 110. Generally, MME 112 provides bearer and connection management. All user IP packets are transferred through Serving Gateway 116, which itself is connected to PDN Gateway 118. PDN Gateway 118 provides UE IP address allocation as well as other functions. PDN Gateway 118 is connected to Operator's IP Services 122. Operator's IP Services 122 may include the Internet, the Intranet, an IP Multimedia Subsystem (IMS), and a PS Streaming Service (PSS).

In some aspects, system 100 may be enabled to facilitate circuit-switched fallback (CSFB). In an aspect, when a phone number is dialed to place a CS call, also referred to as a mobile originated call, if UE 102 were camped on an LTE network, a CSFB procedure may be employed. Similarly, a mobile terminated (incoming) CS voice call triggers a page via LTE to UE 102, and this page initiates CSFB. In particular, UE 102 and system 100 may execute a CSFB procedure that may move UE 102 from an LTE cell to a CS based cell, such as UTRAN, GERAN, etc., where the CS call setup may occur using legacy CS call setup procedures. The term "cell" can refer to a coverage area of an eNB or base station and/or an eNB or base station subsystem serving this coverage area. In this example, for instance, the CS based cell may be a cell provided by Node B 108 of CS network 105. Also used herein, in an aspect, CSFB may include establishing a signaling channel between MSC/VLR 132 and EPC 101 to allow for services, such as voice calls, short message service (SMS), etc. In an implementation, when UE 102 is moved from EPS 101 to a 3GPP network (e.g., 2G/3G), such as a CS network 105 (UTRAN), PS network 103, etc., UE 102 may perform one or more registration procedures prior to being able to communicate user data over the 3GPP network. For example, the procedure may include UE 102 sending an extended service request to the network to transition to CS network 105.

UE 102 may include service acquisition component 150 for determining RAT capability 152 of UE 102, and for acquiring service from one or more available RATs based on RAT capability 152. In some aspects, service acquisition component 150 includes 4G CSFB support determination component 154 that determines whether an available 4G network such as EPS 101 supports CSFB. In these aspects, when UE 102 is required to support voice service, if 4G CSFB support determination component 150 determines that EPS 101 does not support CSFB, service acquisition component 150 inhibits UE 102 from operating according to LTE. In other words, UE 102 does not report a 4G capability (e.g., radio resources enabling operation according to 4G/LTE standards) but has access to one or more other RATs and reports the other RAT capabilities (e.g., radio resources enabling operation according to 2G/3G standards). As such, service acquisition component 150 may only report 2G or 3G capability as RAT capability 152 of UE 102, and as such may allow access only to 2G/3G RATs, so as to avoid disruption in voice services.

For example, in some aspects, in order to determine whether EPS 101 supports CSFB, UE 102 first tries attaching to EPC 110 with a CSFB support indication to MME 112. For example, service acquisition component 150 may execute a combined EPS/CS attach attempt procedure 160. Then, MME 112 communicates with MSC/VLR 132 in a 2G/3G circuit system such as CS network 105 to determine CS domain information, e.g., temporary international mobile subscriber identity (TMSI) and routing area identifier (RAI). EPC 110 then returns that information to UE 102 in an attach accept message 162. Based on the attach accept message 162, if UE 102 detects that combined EPS/CS attach attempt procedure 160 is not complete, then service acquisition component 150 or a component thereof or associated therewith, such as a non-access stratum (NAS) entity of UE 102, indicates an EPS/CS failure mode 164 and causes UE 102 to detach from EPS 101. As such, UE 102 shuts off LTE access and service acquisition component 150 executes to declare 2G/3G-only mode and marks EPS/CS failure mode 164 as, e.g., the combined-attach-failure-rendered 2G/3G-only mode as a special subset of all possible 2G/3G/4G modes. In these aspects, service acquisition component 150 may execute instructions to mark 4G LTE as an extra candidate RAT to, e.g., the radio resource control (RRC) layer at the access stratum of UE 102, so that UE 102 may later be able to perform test and measurement to discover new 4G networks and then determine if they support CSFB. For example, in some aspects, service acquisition component 150 may send an internal multi-mode NAS system selection communication to the RRC, to indicate to the RRC to include LTE among the measurement targets, thereby providing the possibility of reselecting to an LTE cell with attach request upon an area update.

In some aspects, when UE 102 is in 2G/3G-only mode, service acquisition component 150 may attempt to resume supporting LTE based on a 4G service change possibility 157 determined by 4G service change possibility determination component 156. In these aspects, when a 4G service change possibility 157 is determined, service acquisition component 150 may perform and/or trigger execution of a 4G search and measurement procedure 166, such as in cooperation with functionality of a protocol layer, such as the RRC layer (see, e.g., FIG. 3). If the 4G search and measurement procedure 166 indicates that an LTE network is available, the active RAT RRC layer indicates 4G service availability to the NAS entity. The NAS entity then attempts a combined EPS/CS attach and determines whether the LTE network has CSFB support. If the LTE has CSFB support, the NAS entity returns to 2G/3G/4G mode from 2G/3G-only mode. Otherwise, if the LTE network does not have CSFB support, the NAS entity stays in 2G/3G-only mode, and 4G remains as an extra candidate RAT at the RRC layer, waiting to be checked with CSFB support the next time a 4G service change possibility 157 is determined.

In some aspect, 4G service change possibility determination component 156 may determine a 4G service change possibility 157 based on a location change of UE 102 determined by location change determination component 158. In some aspects, for example, location change determination component 158 may determine a location change of UE 102 based on a routing area identifier (RAI) or a location area identifier (LAI) received by UE 102 from a network. For example, the newly received LAI or RAI may indicate a location change of UE 10 when compared against previously received LAIs or RAIs.

In some aspects, 4G service change possibility determination component 156 may determine a 4G service change possibility 157 based on an OOS duration of UE 102 determined by OOS determination component 159 when an active RAT of UE 102 encounters a radio link failure for a threshold period of time, referred to as OOS duration. In some aspects, for example, the threshold period of time may be implemented by a hard coded timer or a configurable timer, may be determined by the UE manufacturer, and may be tunable based on field test results. In some aspects, waiting for the radio link failure to persist over this threshold period of time before declaring a 4G service change possibility 157 may help reduce unnecessary CSFB support determination when the UE is only temporarily out of service and it is unlikely that the UE is moving between areas with and without CSFB support. In some aspects, upon the determination of an OOS duration, the access stratum control is returned back to the NAS entity for service acquisition. In these aspects, since the OOS duration may indicate that UE 102 has moved, and since the access stratum control is consequently returned to the NAS multi-mode system selection module, the OOS duration indicates an opportunity for retrying the LTE network by sending a combined attach request with CSFB indication to determine whether UE 102 can switch back to 2G/3G/4G mode from 2G/3G-only mode. In these aspects, for example, the NAS multi-mode system selection module determines which RATs are used for initial service acquisition and in what sequence, where service acquisition may include power scanning, cell camping, and NAS registration. In some aspects, for example, the NAS multi-mode system selection module does not directly perform such service acquisition, and instead issues commands to the access stratum to perform service acquisition.

Thus, according to the present apparatus and methods, UE 102 configured with service acquisition component 150 and 4G service change possibility determination component 156 provides improved service acquisition, when supporting voice service and initially inhibited from accessing a 4G network based on lack of CSFB support in the 4G network, by re-attempting to acquire a 4G network when a 4G service change possibility is determined. As such, according to the present aspects, UE 102 may more efficiently and/or more quickly acquire 4G service, when supporting voice service and initially inhibited from accessing a 4G network based on lack of CSFB support in the 4G network, without requiring a power on/off cycle.

Figure 2:
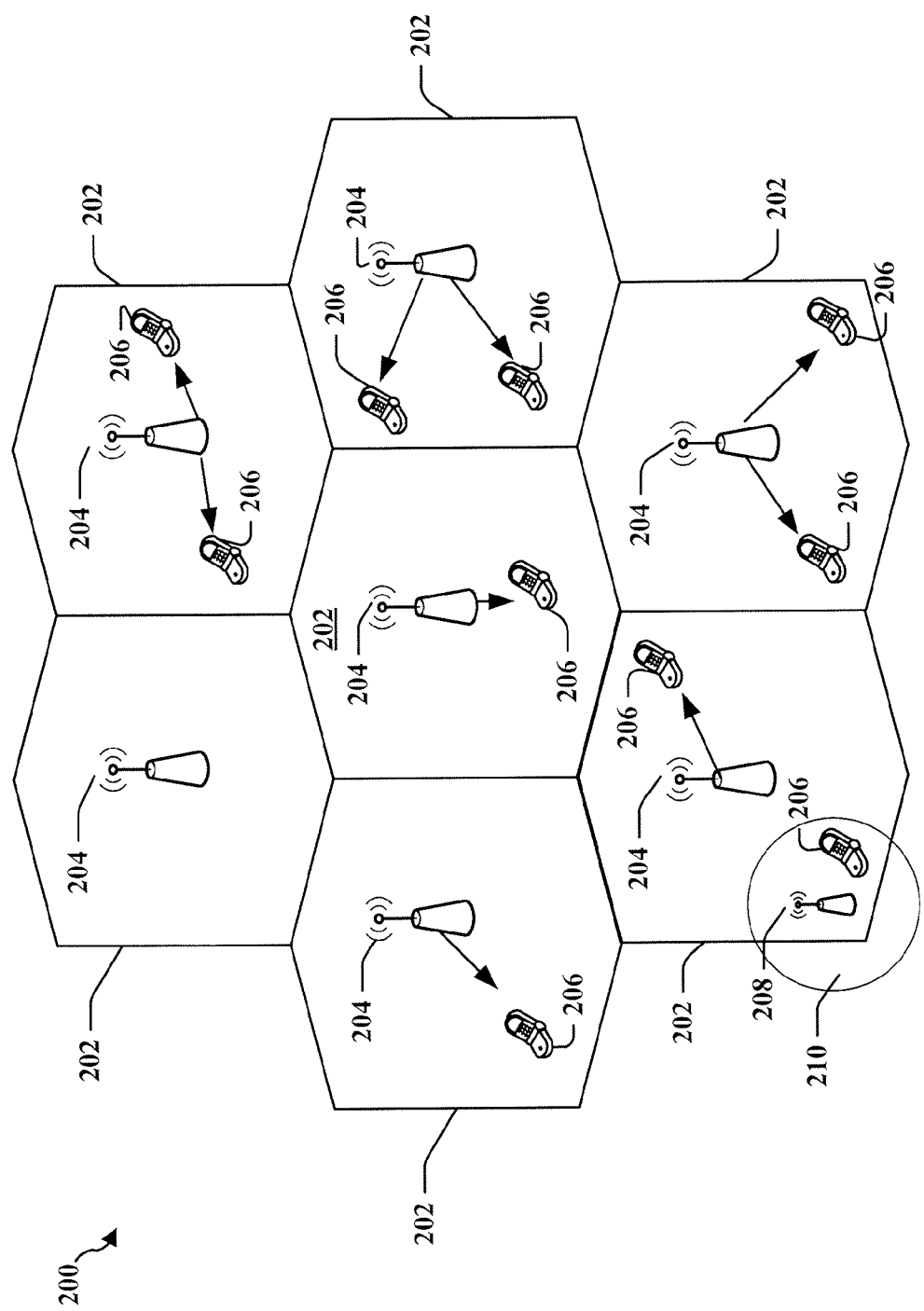
FIG. 2 is a diagram illustrating an example of an access network including aspects of the system of FIG. 1.

FIG. 2 is a diagram illustrating an example of an access network 200 in an LTE network architecture which may include UE 102, eNB 106, and/or respective components thereof (see FIG. 1). In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
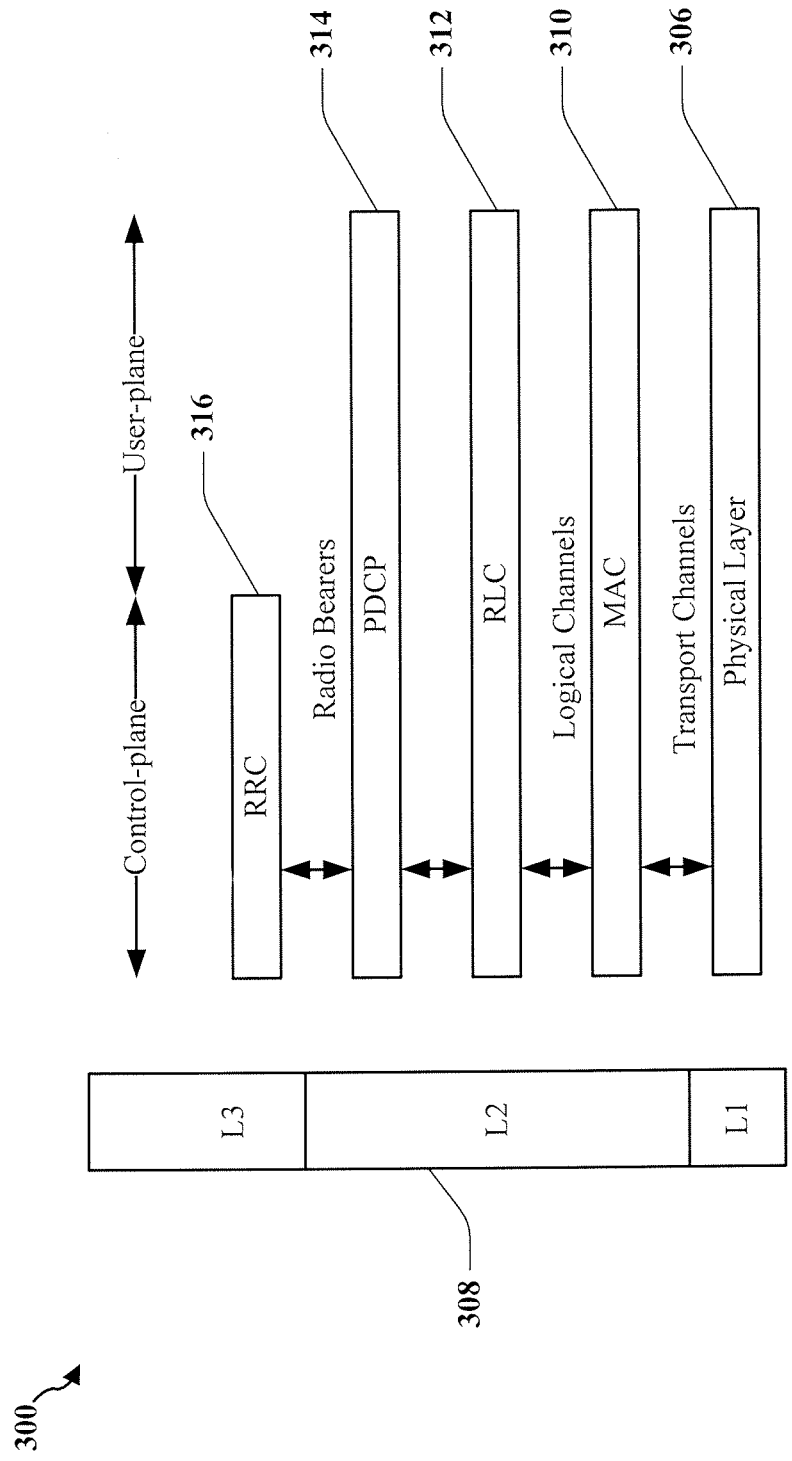
FIG. 3 is a diagram illustrating an example of a radio protocol architecture for the user and control planes in aspects of the system of FIG. 1

FIG. 3 is a diagram 300 illustrating an example of a radio protocol architecture for the user and control planes in LTE for a UE and an eNB, which may be UE 102, 206 or eNB 106, 204 (see FIGS. 1 and 2). The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 306. Layer 2 (L2 layer) 308 is above the physical layer 306 and is responsible for the link between the UE and eNB over the physical layer 306.

In the user plane, the L2 layer 308 includes a media access control (MAC) sublayer 310, a radio link control (RLC) sublayer 312, and a packet data convergence protocol (PDCP) 314 sublayer, which are terminated at the eNB on the network side. Although not shown, the UE may have several upper layers above the L2 layer 308 including a network layer (e.g., IP layer) that is terminated at the PDN gateway 118 (see FIG. 1) on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between eNBs. The RLC sublayer 312 provides segmentation and reassembly of upper layer data packets, retransmission of lost data packets, and reordering of data packets to compensate for out-of-order reception due to hybrid automatic repeat request (HARQ). The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

In the control plane, the radio protocol architecture for the UE and eNB is substantially the same for the physical layer 306 and the L2 layer 308 with the exception that there is no header compression function for the control plane. The control plane also includes a radio resource control (RRC) sublayer 316 in Layer 3 (L3 layer). The RRC sublayer 316 is responsible for obtaining radio resources (i.e., radio bearers) and for configuring the lower layers using RRC signaling between the eNB and the UE.

Figure 4:
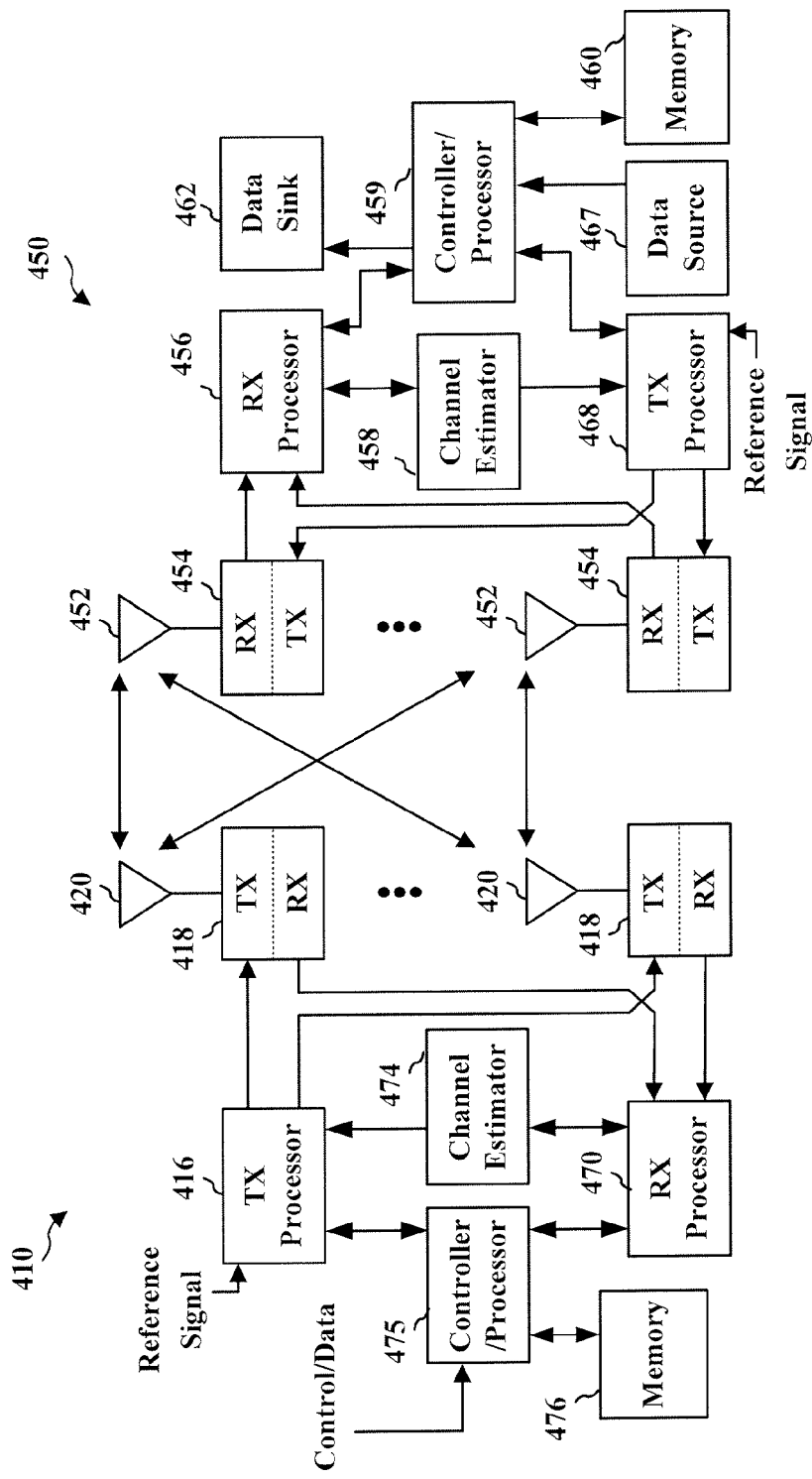
FIG. 4 is a diagram illustrating an example of an evolved Node B and user equipment in an access network, including aspects of the system of FIG. 1.

FIG. 4 is a block diagram of an eNB 410 in communication with a UE 450 in an access network where eNB 410 and UE 450 may be eNB 106, 204, UE 102, 206, and/or respective components thereof (see FIGS. 1 and 2). In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the UE 450 based on various priority metrics. The controller/processor 475 is also responsible for HARQ operations, retransmission of lost packets, and signaling to the UE 450.

The transmit (TX) processor 416 implements various signal processing functions for the L1 layer (i.e., physical layer). The signal processing functions includes coding and interleaving to facilitate forward error correction (FEC) at the UE 450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream is then provided to a different antenna 420 via a separate transmitter 418TX. Each transmitter 418TX modulates an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 performs spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 410. These soft decisions may be based on channel estimates computed by the channel estimator 458. The soft decisions are then decoded and deinterleaved to recover the data and control signals that were originally transmitted by the eNB 410 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the eNB 410, the controller/processor 459 implements the L2 layer for the user plane and the control plane by providing header compression, ciphering, packet segmentation and reordering, and multiplexing between logical and transport channels based on radio resource allocations by the eNB 410. The controller/processor 459 is also responsible for HARQ operations, retransmission of lost packets, and signaling to the eNB 410.

Channel estimates derived by a channel estimator 458 from a reference signal or feedback transmitted by the eNB 410 may be used by the TX processor 468 to select the appropriate coding and modulation schemes, and to facilitate spatial processing. The spatial streams generated by the TX processor 468 are provided to different antenna 452 via separate transmitters 454TX. Each transmitter 454TX modulates an RF carrier with a respective spatial stream for transmission.

The UL transmission is processed at the eNB 410 in a manner similar to that described in connection with the receiver function at the UE 450. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the control/processor 475 provides demultiplexing between transport and logical channels, packet reassembly, deciphering, header decompression, control signal processing to recover upper layer packets from the UE 450. Upper layer packets from the controller/processor 475 may be provided to the core network. The controller/processor 475 is also responsible for error detection using an ACK and/or NACK protocol to support HARQ operations.

Figure 5:
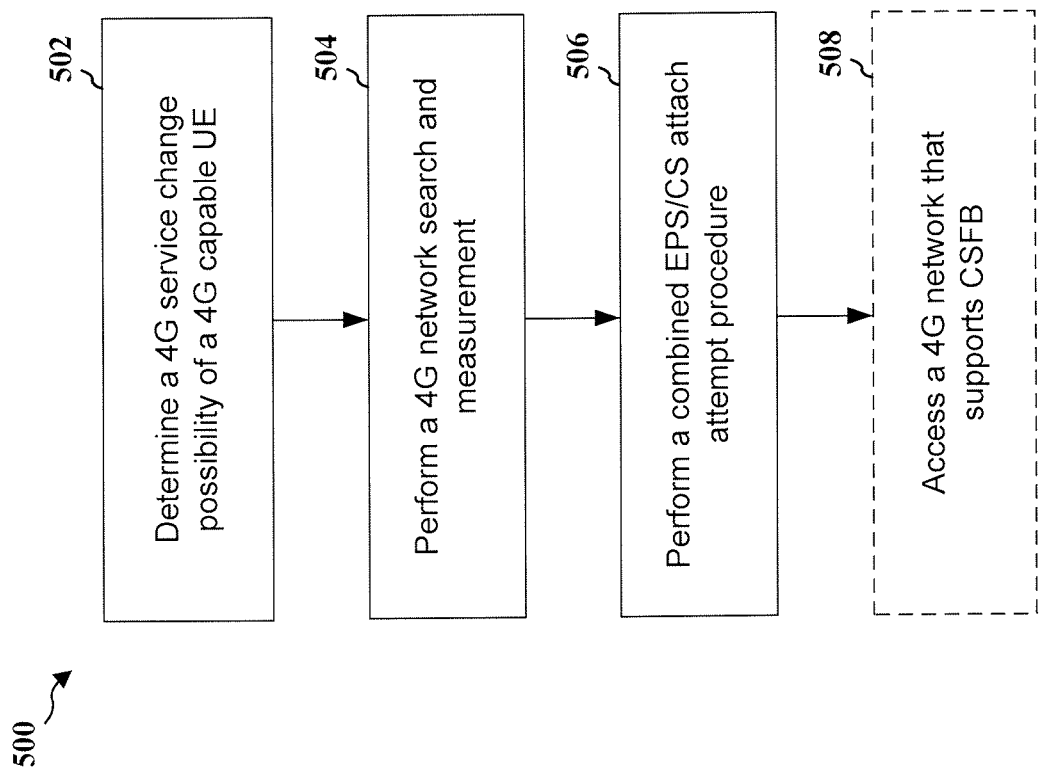
FIG. 5 is a flow chart of a method of the system of FIG. 1.

Referring to FIG. 5, in one aspect, a method 500 is illustrated for wireless communication at a 4G capable UE that does not have access to a 4G RAT but has access to one or more other RATs. For explanatory purposes, method 500 will be discussed with reference to the above described FIG. 1. It should be understood that in other implementations, other systems and/or UEs, Node Bs, or other apparatus comprising different components than those illustrated in FIG. 1 may be used in implementing method 500.

At block 502, method 500 includes determining, when the 4G capable UE does not report a 4G capability but reports one or more other RAT capabilities, a 4G service change possibility for the 4G capable UE. For example, in an aspect, UE 102 may initially be inhibited from using LTE due to lack of support for CSFB in the 4G network when the UE 102 is operating to support voice services. Subsequently, UE 102 may operate to determine 4G service change possibility 157, and hence an opportunity that a new 4G network may support CSFB. For instance, in an aspect, UE 102 may determine 4G service change possibility 157 based on the execution of location change determination component 158 upon determining a location change of UE 102. In another aspect, for example, UE 102 may determine 4G service change possibility 157 based on the execution of OOS determination component 159 upon determining an OOS duration of UE 102.

At block 504, method 500 includes performing a 4G network search and measurement in response to the determination of 4G service change possibility. For example, in an aspect, service acquisition component 150 may perform a 4G network search and measurement procedure in response to a location change determined by location change determination component 158, or in response to an OOS duration determined by OOS determination component 159.

At block 506, method 500 includes performing a combined EPS/CS attach attempt procedure when the 4G network search and measurement indicates a 4G network availability. For example, in an aspect, service acquisition component 150 may perform a combined EPS/CS attach attempt procedure 160 to access EPS 101 when the 4G network search and measurement indicates that EPS 101 is available. In some aspects, based on the result of the combined EPS/CS attach attempt procedure 160, UE 102 may then determine if EPS 101 supports CSFB. In these aspects, if UE 102 determines that EPS 101 supports CSFB, UE 102 may report a 4G capability. Otherwise, if UE 102 determines that EPS 101 does not support CSFB, UE 102 may report only 2G/3G capability and may continue checking for 4G service change possibilities.

At block 508, method 500 may optionally include accessing the 4G network when the combined EPS/CS attach attempt procedure indicates that the 4G network supports a CSFB. For example, based on the result of the combined EPS/CS attach attempt procedure 160 at block 605, if UE 102 determines that EPS 101 supports CSFB, UE 102 may access the 4G network of EPS 101.

Figure 6:
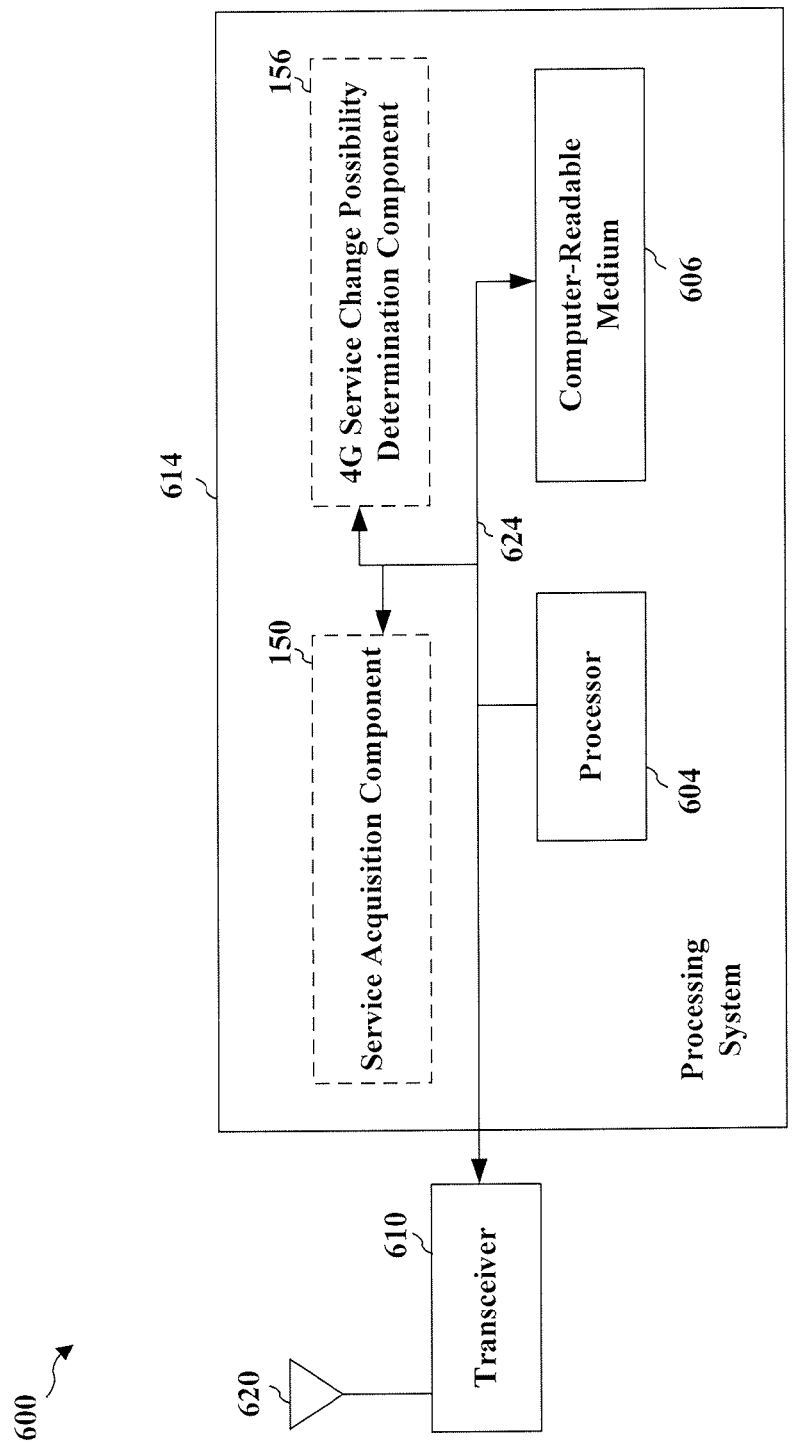
FIG. 6 is a diagram illustrating an example of a hardware implementation for an apparatus of FIG. 1 employing a processing system.

FIG. 6 illustrates an example of a hardware implementation for an apparatus 600 employing a processing system 614 to operate, for example, UE 102, 206, 450 and/or respective components thereof (see FIGS. 1, 2, and 4), including service acquisition component 150 and 4G service change possibility determination component 156. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware modules, represented by the processor 604, service acquisition component 150, 4G service change possibility determination component 156 (see FIG. 1), and the computer-readable medium 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas 620. The transceiver 610 provides a means for communicating with various other apparatus over a transmission medium. The processing system 614 includes a processor 604 coupled to a computer-readable medium 606. The processor 604 is responsible for general processing, including the execution of software stored on the computer-readable medium 606. The software, when executed by the processor 604, causes the processing system 614 to perform the various functions described supra for any particular apparatus. The computer-readable medium 606 may also be used for storing data that is manipulated by the processor 604 when executing software. The processing system further includes at least one of service acquisition component 150, 4G service change possibility determination component 156 (see FIG. 1) which may be software modules running in the processor 604, resident/stored in the computer readable medium 606, one or more hardware modules coupled to the processor 604, or some combination thereof. The processing system 614 may be a component of the UE 450 and may include the memory 460 and/or at least one of the TX processor 468, the RX processor 456, and the controller/processor 459 (see FIG. 4).

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications at a fourth generation (4G) capable user equipment (UE), comprising:
   determining, when the 4G capable UE does not report a 4G capability but reports one or more other radio access technology (RAT) capabilities, a 4G service change possibility for the 4G capable UE;
   performing a 4G network search and measurement procedure in response to the determination of the 4G service change possibility; and
   performing a combined evolved packet system/circuit switched (EPS/CS) attach attempt procedure when the 4G network search and measurement procedure indicates a 4G network availability.

2. The method of claim 1, wherein:
   determining the 4G service change possibility comprises determining a location change of the 4G capable UE, and
   performing the 4G network search and measurement procedure is in response to the location change of the 4G capable UE.

3. The method of claim 2, wherein the location change is determined based on a location area identifier (LAI) or a routing area identifier (RAI).

4. The method of claim 1, wherein:
   determining the 4G service change possibility comprises determining an out-of-service (OOS) duration of the 4G capable UE, and
   performing the 4G network search and measurement procedure is in response to the OOS duration.

5. The method of claim 4, wherein the OOS duration is determined based on a failure in one or more active RATs of the 4G capable UE.

6. The method of claim 1, wherein the one or more other RATs includes at least one of a second generation (2G) RAT or a third generation (3G) RAT.

7. The method of claim 1, further comprising:
   accessing the 4G network when the combined EPS/CS attach attempt procedure indicates that the 4G network supports a circuit switched fallback (CSFB).

8. The method of claim 1, wherein the 4G capable UE is required to support voice services.

9. The method of claim 1, further comprising:
   indicating that the 4G capable UE is in an EPS/CS failure mode, by a non-access stratum of the 4G capable UE, when the 4G capable UE does not report the 4G capability but reports the one or more other RAT capabilities, wherein the EPF/CS failure mode indicates that the 4G capable UE does not have access to a 4G RAT due to a previous EPC/CS attach attempt failure.

10. A fourth generation (4G) capable user equipment (UE), comprising:
    a 4G service change possibility determination component configured to:
      determine, when the 4G capable UE does not report a 4G capability but reports one or more other radio access technology (RAT) capabilities, a 4G service change possibility for the 4G capable UE;
    and
    a service acquisition component configured to:
      perform a 4G network search and measurement procedure in response to the determination of the 4G service change possibility; and
      perform a combined evolved packet system/circuit switched (EPS/CS) attach attempt procedure when the 4G network search and measurement procedure indicates a 4G network availability.

11. The 4G capable UE of claim 10, wherein:
    the 4G service change possibility determination component is further configured to determine a location change of the 4G capable UE, and
    the service acquisition component is further configured to perform the 4G network search and measurement procedure in response to the location change of the 4G capable UE.

12. The 4G capable UE of claim 11, wherein the location change is determined based on a location area identifier (LAI) or a routing area identifier (RAI).

13. The 4G capable UE of claim 10, wherein:
    the 4G service change possibility determination component is further configured to determine an out-of-service (OOS) duration of the 4G capable UE, and
    the service acquisition component is further configured to perform the 4G network search and measurement procedure in response to the OOS duration.

14. The 4G capable UE of claim 13, wherein the OOS duration is determined based on a failure in one or more active RATs of the 4G capable UE.

15. The 4G capable UE of claim 10, wherein the one or more other RATs includes at least one of a second generation (2G) RAT or a third generation (3G) RAT.

16. The 4G capable UE of claim 10, wherein the service acquisition component is further configured to:
    access the 4G network when the combined EPS/CS attach attempt procedure indicates that the 4G network supports a circuit switched fallback (CSFB).

17. The 4G capable UE of claim 10, wherein the 4G capable UE is required to support voice services.

18. The 4G capable UE of claim 10, wherein the service acquisition component is further configured to:
    indicate that the 4G capable UE is in an EPS/CS failure mode, by a non-access stratum of the 4G capable UE, when the 4G capable UE does not report the 4G capability but reports the one or more other RAT capabilities, wherein the EPF/CS failure mode indicates that the 4G capable UE does not have access to a 4G RAT due to a previous EPC/CS attach attempt failure.

19. A fourth generation (4G) capable user equipment (UE), comprising:
    means for determining, when the 4G capable UE does not report a 4G capability but reports one or more other radio access technology (RAT) capabilities, a 4G service change possibility for the 4G capable UE;
    means for performing a 4G network search and measurement procedure in response to the determination of the 4G service change possibility; and
    means for performing a combined evolved packet system/circuit switched (EPS/CS) attach attempt procedure when the 4G network search and measurement procedure indicates a 4G network availability.

20. A non-transitory computer-readable medium for a fourth generation (4G) capable user equipment (UE), comprising:
    code executable by a computer to determine, when the 4G capable UE does not report a 4G capability but reports one or more other radio access technology (RAT) capabilities, a 4G service change possibility for the 4G capable UE;

code executable by the computer to perform a 4G network search and measurement procedure in response to the determination of the 4G service change possibility; and code executable by the computer to perform a combined evolved packet system/circuit switched (EPS/CS) attach attempt procedure when the 4G network search and measurement procedure indicates a 4G network availability.

* * * * *